United States Patent [19]
Ford et al.

[11] Patent Number: 5,975,571
[45] Date of Patent: Nov. 2, 1999

[54] SINGLE PIECE AIR BAG WITH IMPROVED STRESS DISTRIBUTION

[75] Inventors: Brian C. Ford, Mt. Clemens; Anne Marie Hillenbrand, White Lake, both of Mich.

[73] Assignee: Breed Automotive Technology, Inc., Lakeland, Fla.

[21] Appl. No.: 08/896,040

[22] Filed: Jul. 17, 1997

[51] Int. Cl.⁶ .................................................. B60R 21/16
[52] U.S. Cl. ..................................... 280/743.1; 280/728.1
[58] Field of Search ........................... 280/728.1, 743.1, 280/743.2

[56] References Cited

U.S. PATENT DOCUMENTS

| | | |
|---|---|---|
| 5,316,337 | 5/1994 | Yamaji et al. .................... 280/728.1 |
| 5,529,340 | 6/1996 | Fairbanks ......................... 280/728.1 |
| 5,632,506 | 5/1997 | Shellabarger ..................... 280/743.1 |
| 5,782,488 | 7/1998 | Lewis et al. ..................... 280/743.1 |

*Primary Examiner*—Paul N. Dickson
*Attorney, Agent, or Firm*—Markell Seitzman

[57] ABSTRACT

An inflatable air bag (20') having an inlet (24) adapted to be attached to a source of inflation gas (70), initially maintained in a folded configuration prior to being inflated, the air bag being rapidly inflated by the inflation gas creating certain stresses within the material, the air bag including a plurality of seams (90) formed along joined arcuate edges of a single piece of material (50), wherein the seams are arranged about the air bag at locations remote from the location of maximum stress.

17 Claims, 9 Drawing Sheets

SINGLE PIECE AIR BAG WITH IMPROVED STRESS DISTRIBUTION

BACKGROUND AND SUMMARY OF THE INVENTION

The present invention generally relates to air bags used in an occupant protection safety system and more particularly to an air bag made from a single piece of material.

Conventional air bags are typically manufactured using several pieces of cloth that are cut in a prescribed pattern and sewn together to create an inflatable cushion having the desired shape. It is also known in the art that an air bag can be manufactured from a single piece of material. This type of air bag is shown in U.S. Pat. Nos. 5,316,337 and 5,310,216. As can be appreciated, the use of a single piece of material may lead to economies of manufacture.

Figure 1:
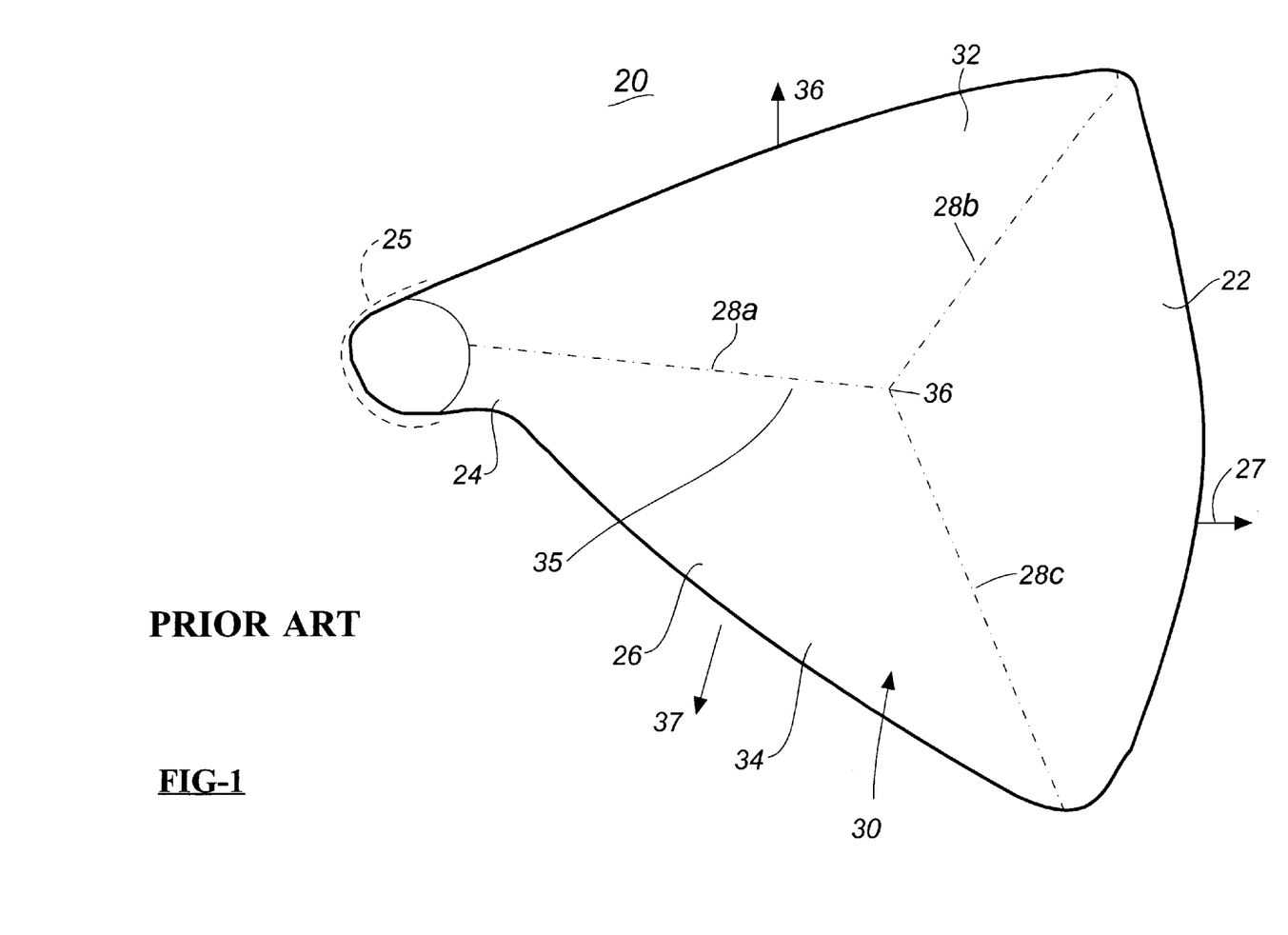
FIG. 1 is representative of an inflated, prior art air bag.

Reference is made to FIG. 1 which illustrates an inflated air bag 20 which is made from a single piece of material which when laid flat is similar to the pattern shown in the above mentioned patents. This pattern of material (arranged as a single piece of material or using a plurality of pieces of material) typically includes geometric shapes having straight edges adjacent each other. When assembled, the air bag 20 will include a first, face or front portion 22, an inlet or neck 24 adapted in a known manner to be wrapped or fitted about an air bag manifold, which holds an inflator (or directly to an inflator), and a middle portion 26 interconnecting the front 22 and inlet 24 portions. Prior to inflation the cushion is folded or rolled into a compacted configuration and positioned about an inflator (not shown) and secured to a housing 25. The middle portion 26 is formed by joining various straight edges of the material pattern together at a plurality of seams 28a,b,c. As can be appreciated, FIG. 1 illustrates the right hand side of air bag 20. The left hand side of air bag 20 will also include a similar or identical pattern of seams. As can be appreciated, if the material pattern comprises a series of straight edges, the resulting seams will also be straight. The typical layout of the seams of this type of air bag 20 has a straight side seam such as 28a running from the inlet 24 toward the front portion 22 and radially diverging straight seams such as 28b and 28c. Experience has shown that the straight sides of the material pattern and resulting straight seams constrain design alternatives by limiting the number of shapes a cushion can have. In addition, such a cushion may require unwanted and unneeded folds and tucks to achieve its folded or compact configuration. This type of air bag also displays a less than optimal stress distribution, which overly stresses the material at the seams, which may result in leakage or tearing (at or near the seams) when the air bag inflates. This stress distribution results because the seams lie in a straight line along the contour of the inflated cushion and in line with the direction of air bag inflation. Upon activation of the inflator, inflation gas is produced or transmitted to the air bag which causes the air bag to unfold or unroll in a rapid manner, rapidly propelling the cushion material in a direction away from the housing 25 (generally toward the occupant to be protected, see arrow 27) at a high rate of speed. As the material reaches its maximum extension and decelerates, high stresses will be developed in the straight seams which tends to pull the seams apart especially at the common point such as 36 which often exhibits a region of maximum stress. During inflation the cushion 30 will generally become pressurized evenly throughout such that the top 32, bottom 34 and sides 35 of the cushion 30 will expand outwardly and the face or front portion 22 of the cushion material will pull away from the inlet (housing) stressing the seams. The momentum of the inflation gas particles generally acts to propel the bag toward the occupant in direction 27 while at the same time push the cushion generally in the direction of arrows 36 and 37. As can be appreciated, stresses are produced which are tangent or parallel to the seams (running along the exterior contour of the bag) which tends to pull the seams apart. In general, the seams represent a discontinuity in the cushion material, and therefore are the weakest part of the cushion.

In contrast, the present invention utilizes a one-piece, material pattern with a series of concave and convex edges that are joined together forming corresponding Princess seams or seam lines. As will be seen, this construction permits the cushion material, rather than the seams, to absorb the developed stresses. Further, the convex and concavely seams give the designer (of the air bag) the ability to achieve a greater number of bag shapes and to reposition the seams away from the regions of maximum stress such that the material, rather than the seams, absorbs the stresses. As such, the stresses generated are less prone to break the seams.

Accordingly the invention comprises: an inflatable air bag having: an inlet portion adapted to be attached to a source of inflation gas and a cushion portion, initially maintained in a folded or rolled configuration prior to being inflated, the cushion portion being rapidly inflated by the inflation gas wherein certain stresses are created within the material of the cushion during the inflation interval, the cushion including a plurality of convex/concave sets of seams joining certain edges of the cushion material together to thereby form the cushion, wherein the seams are arranged about the cushion at locations remote from the location of maximum stress.

It is an object of the present invention to provide a robust air bag and one that is easy to manufacture. The manufacturability of this cushion is improved by reducing the number of manual steps (such as the number of seams) and equipment (as an example quilting machines, may not be required), the number of parts, the amount of cloth required, and the amount of time to cut the cloth and sew the cushion. All of these improvements create a cushion that improves quality while reducing manufacturing costs.

Many other objects and purposes of the invention will be clear from the following detailed description of the drawings.

DETAILED DESCRIPTION OF THE DRAWINGS

Figure 2:
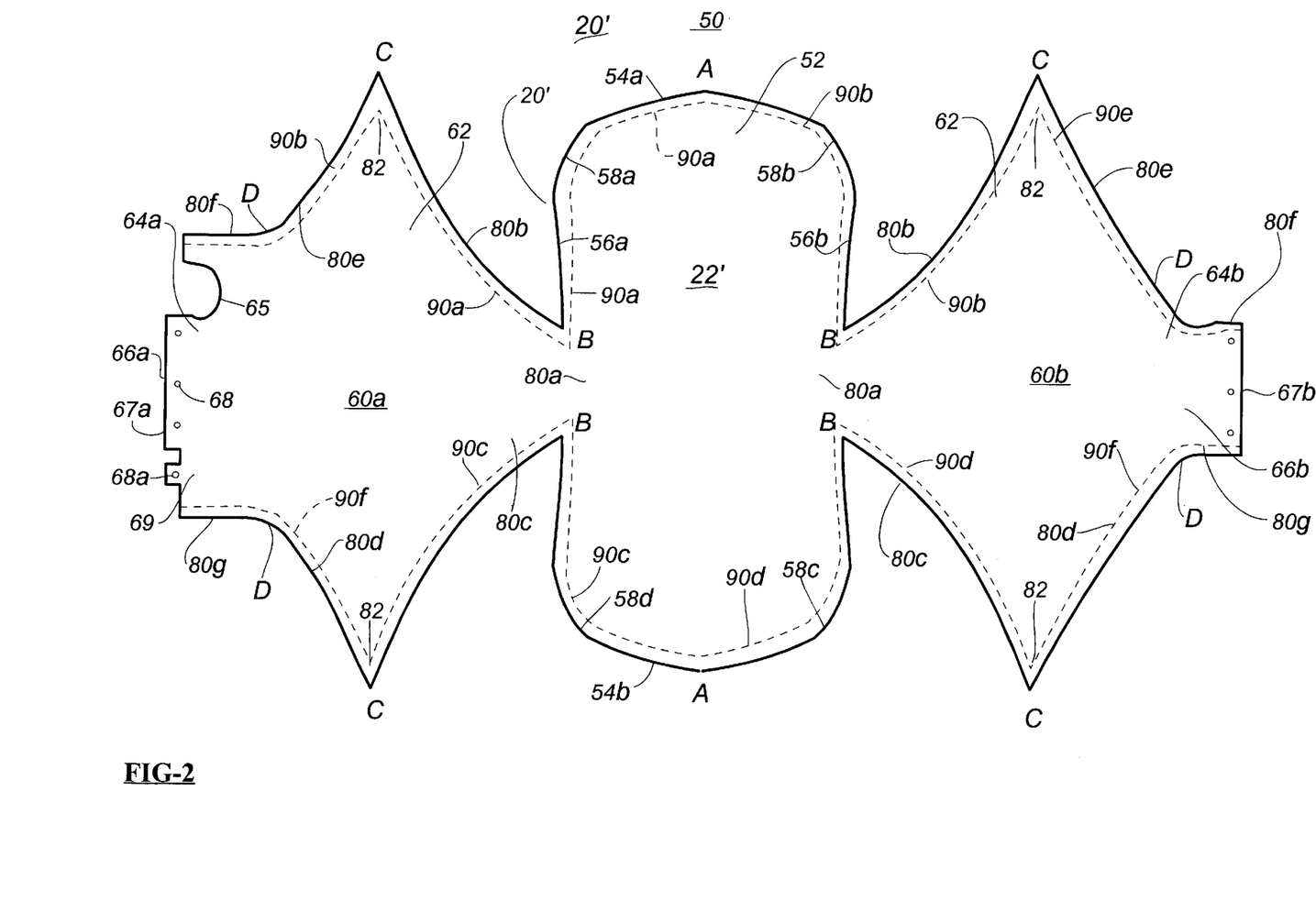
FIG. 2 is a view of a single piece of fabric used to construct the air bag in accordance with the present invention.

Reference is now made to FIG. 2 which illustrates a first embodiment of the present invention. More specifically, there is shown a material pattern 50 for the construction of a preferably one-piece air bag 20'. The pattern 50 has a generally quadrilateral center portion 52 which will form the face or front portion 22' of the air bag 20'. The center portion 52 includes first and second sets of opposing sides or edges 54a,b and 56a,b respectively. Joining each of the sides are arcuately (convex) shaped corners 58a–d. Sides 54a,b are generally convex outwardly, while sides 56a,b are concave inwardly. In this particular application, these curved material sections permit the air bag designer greater flexibility to achieve an air bag having the desired shape, while being able to relocate the points or areas of maximum stress into the material and away from the seams. The concave and convex curvature of the various edges or sides may be reversed. The capital letter A represents the center of the sides or edges 54a and 54b. Extending outwardly from sides 56a,b are respective lateral panels 60a and 60b (which are typically used to form the top and bottom of the middle and neck portion of the air bag). Each of the panels 60a and b includes a polygon-shaped first portion 62 which transitions to respective connecting portions or sections 64a and 64b each of which is used to join or attach the air bag to a cooperating inflator. As can be seen the width of each portion 64a,b is different as described below, and enabling these connection sections to be wrapped about a manifold and/or inflator. Each connecting section includes sides 80f and 80g.

Figure 3:
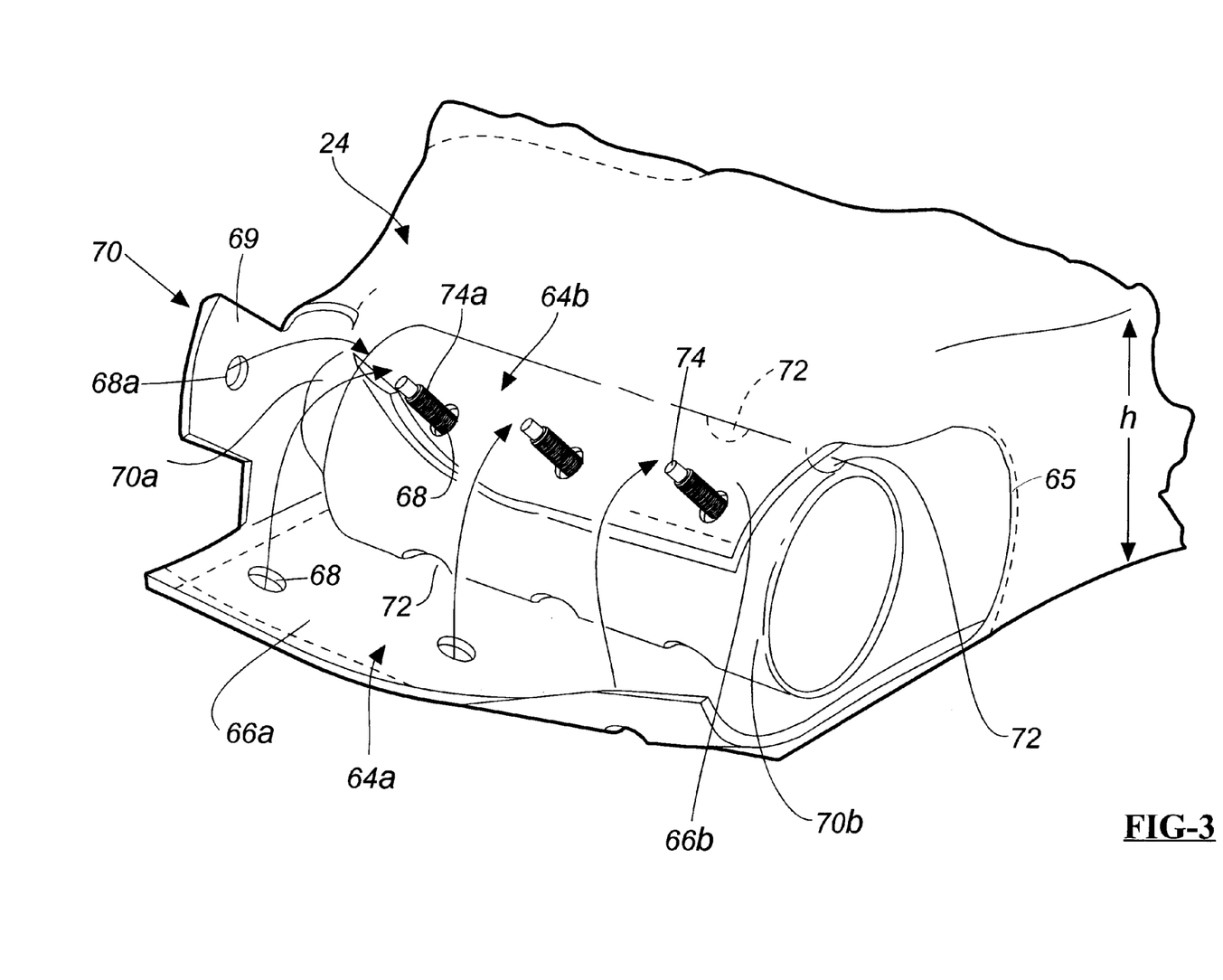
FIG. 3 diagrammatically illustrates the interconnection between an air bag and a typical air bag inflator.

Each polygonal extending section 62 of each panel 60a and 60b includes a side segment 80a having a length which is an integral part of the center panel 52 and a part of each respective side 56a,b (of the center panel 52) and further includes concave shaped sides or edges (sew edges) 80b and 80c which extend outwardly relative to the center panel 52. The intersection of edges 80b and 80c with side 56a (as well as side 56b) of the panel 52 is designated by the letter B. Each polygonal section 62 further includes two opposing inflection points 82 which are also designated by letter C and a descending pair of concave edges or sides 80d and 80e extend inwardly relative to sides or edges 80b and 80c and extend back to the connecting sections 64a,b. The ends of the edges 80d and 80e, at the intersection with the respective sides 80f and 80g of each connecting portion 64a,b of each panel 62, are designated by capital letter D. Further, the distance from segments 80a to the end edge 67a of the left side panel 60a is slightly greater than the distance from segments 80b to the end edge 67b of the right hand panel 60b to permit the connecting section 64a to be wrapped about a portion of the inflator/manifold 70 (as shown in FIG. 3).

As can also be seen from FIG. 2 the distance along the sides or edges of the center panel 52 from the various points B to point A is equal to the distance along edges 80b and 80c from B to point C. During the assembly of the air bag 20', the sew edge 80b is placed adjacent the edges 56a, corner 58a and edge 54a and sewn thereto. The dashed line 90a is illustrative of the resulting sew seam joining edge 80b with sides or edge 56a, 54a and corner 58a. The edges 80b of section 60b are similarly sewn to the first section 52 along side 56a, corner 58b and side 54a; this seam is identified as 90b. The above procedure is repeated for lower sides or edges 80c of each polygonal section 60a,b defining sew seams 90c and 90d respectively. As a result of forming the four seams 90a–90d the two upper points, designated as C, and the two lower C points have been repositioned proximate the upper and lower A points on the center panel 52. Subsequently, the various edges 80e and 80f (of each section 60a, 60b and 64a,b) are moved together and sewn along a sew line designated as 90e. Similarly edges 80e (of sections 60a and 60b) are joined together along an illustrative sew line generally designated as 90f. The last two sewing operations give the neck 24 a tubular configuration to receive the inflator (or manifold) 70 as shown in FIG. 3.

As can be seen from FIG. 2 the connecting section 64a includes an oblong cutout 65. The location of this cutout 65 (in the sewn-together bag 20') can also be seen in FIG. 3 in relation to the neck 24. The connecting section 64a is wider than section 64b. As can be seen from FIG. 3 this increased width (after sections 64a and 64b are sewn together, permits the neck 24 to be formed into a generally rectangular, open tubular shape with height h to more easily fit an inflator or manifold therein. Reference is briefly made to FIG. 3 which shows the connecting sections 64a,b secured about a manifold (or inflator). The manifold (or inflator) 70 includes one or more exit ports 72 through which inflation gas flows into the inlet 24 of the assembled air bag 20' and a plurality of mounting studs 74, 74a which are used to secure the air bag 20' thereto inflator and to secure the manifold (or inflator) to a housing or mounting structure. The following more specifically describes how to attach the neck 24 of the air bag to a manifold 70 having three mounting studs 74. The manifold 70 is placed into the rectangular neck 24 opening and flap 66b is positioned about the manifold with the studs 74 extending through the mounting holes 68. A tab 69 (of material), of connecting section 64a, is moved inwardly so that its mounting hole 68a fits over the adjacent mounting stud 74a pulling part of the neck material about the left end 70a of the manifold (or inflator) 70. Subsequently, the flap 66a (of connection section 64a) is moved onto the studs 74 overlapping the material tab 69 and flap 66b. In this configuration, the opening 65 is located adjacent the right hand end 70b of the manifold 70 providing access to the manifold. As can be appreciated, after having mounted the air bag to the manifold, and thereafter folding the air bag into a compact configuration and retaining the air bag to the manifold (using a material band) the inflator can subsequently be inserted into the completed sub-assembly of the manifold and folded air bag at a later stage of manufacture. As mentioned above, the studs 74 can extend directly from an inflator, in which case a manifold would not be used.

Figure 4:
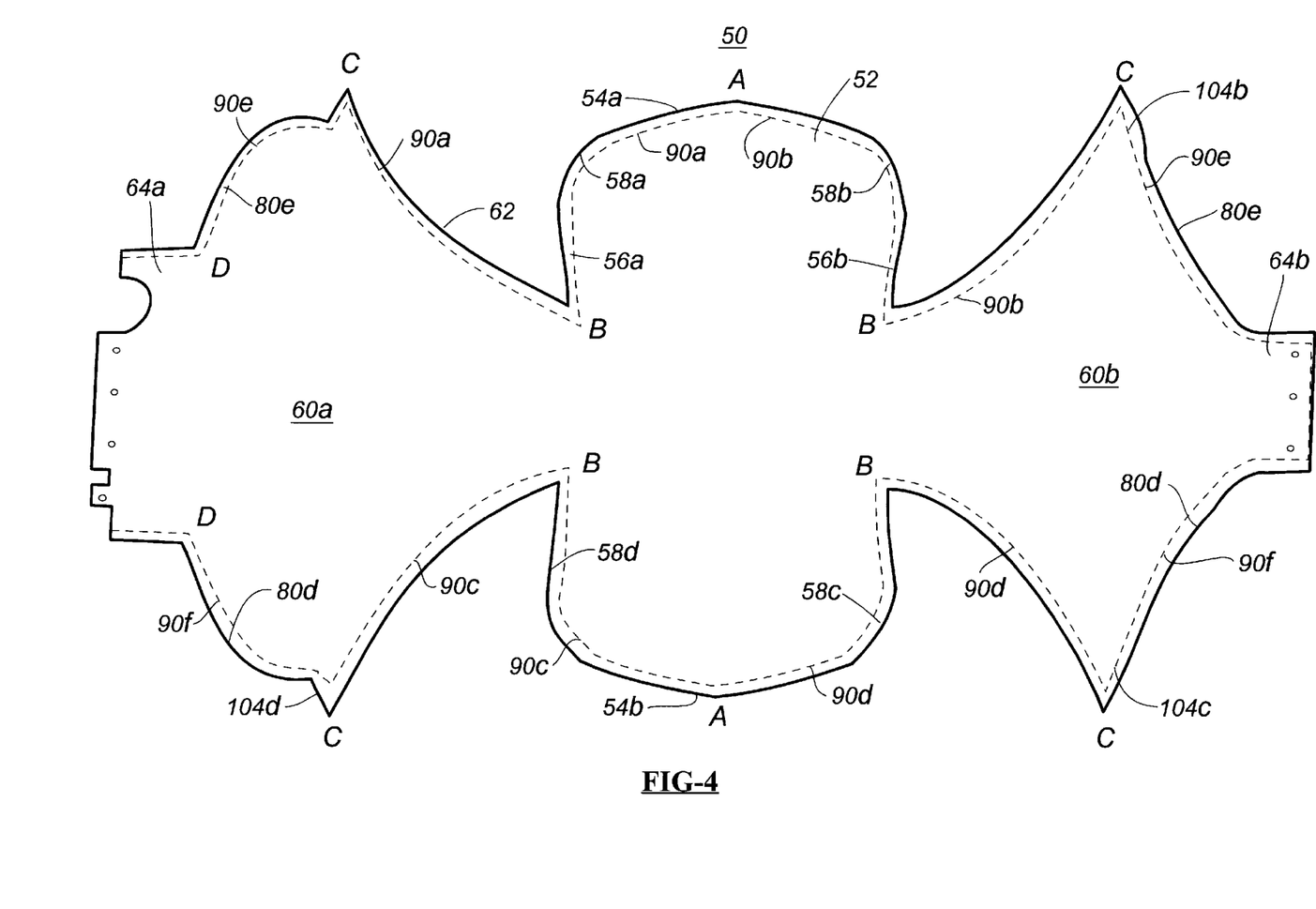
FIG. 4 illustrates an alternate embodiment of the invention.
Figure 5:
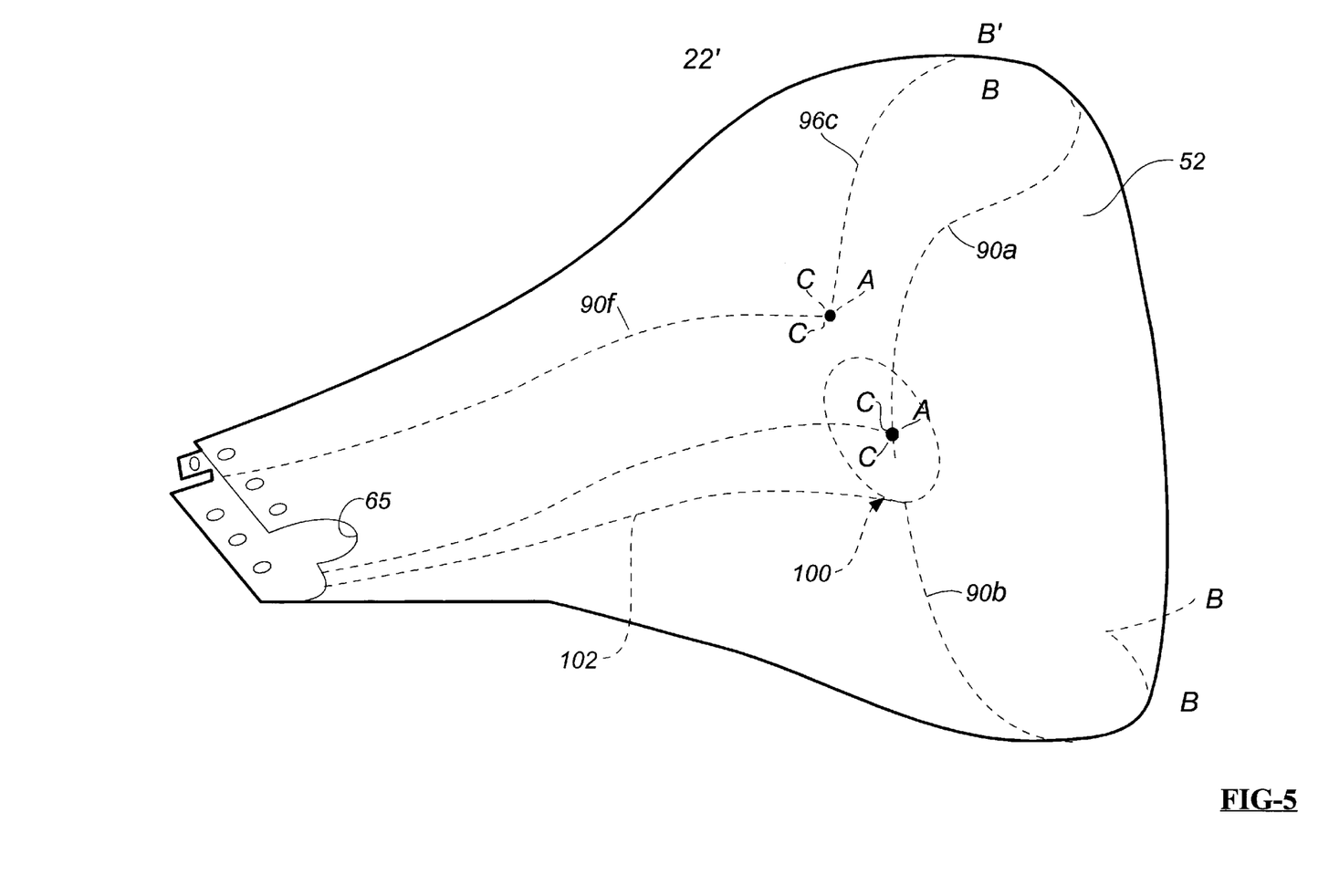
FIG. 5 illustrates an isometric view of an assembled, inflated air bag.

Reference is now made to FIG. 4 which illustrates an alternate embodiment of the invention. The assembled air bag 20' is shown in FIG. 5. In this embodiment, the edges or sides 80d and 80e of sections 60a, adjacent connecting section 64a, are shaped convexly outwardly while edges or sides 80e and 80d of section 60b are concave inwardly shaped. This construction adds an additional concave/convex seam to the air bag which has the benefit of further relieving stresses in the neck 24 of the bag. In contrast to the design of FIG. 2, the edges 80d and 80e do not smoothly intersect the respective points C but terminate inwardly of such point C to form a respective wing 104a–d. The concave/convex design of the lower portion of each respective panel 60a, 60b (when sewn together) achieves the desired bag shape while positioning the various seams near the neck 24 away from the areas of maximum stress making the neck more robust.

FIG. 5 shows the general shape of an inflated air bag 20' constructed in accordance with the material pattern of FIG. 4 (and is generally similar to the shape that would be achieved for the material pattern of FIG. 2). The size of the air bag 20' was chosen to be similar to that of air bag 20 to illustrate the advantages of the present invention. As might be expected the air bag 20' will be pressurized to the same level of pressure as that of air bag 20 and will achieve a stress distribution similar to that of air bag 20. Region 100 and dotted line 102 respectively illustrate the maximum stress concentration locations achieved on a particular side of the air bag and the general line of stress concentration which, as can be seen, is directed through the air bag material and not along any of the seams as it was in the prior art. The various sew lines or seams 90*a*, 90*b* are removed from these regions of concentrated stress because of the choice of the size and curves of the edges of the material 50. As can be seen from the above, the various sew lines have been created using one convex portion of material which is sewed to an adjoining concave shaped piece of material. With this curved seam, only a portion of the stresses created in the material are directed perpendicularly across the seam. This type of construction has been used in the field of women's apparel to create dresses having artistic contours. This type of seam has been called a "Princess Seam" typically used about the bodice of a dress. After an initial design of an air bag 20' is tested the material and seams are inspected to determine that they have not been stressed beyond the applicable design levels. If for example during this inspection it is determined that a certain portion of a seam has been overly stressed, the designer will modify the amount of concave and convex curvature of the affected seam to move the seam to a different location on the exterior contour of the air bag 20' that exhibits the desired acceptable stress levels.

Figure 6:
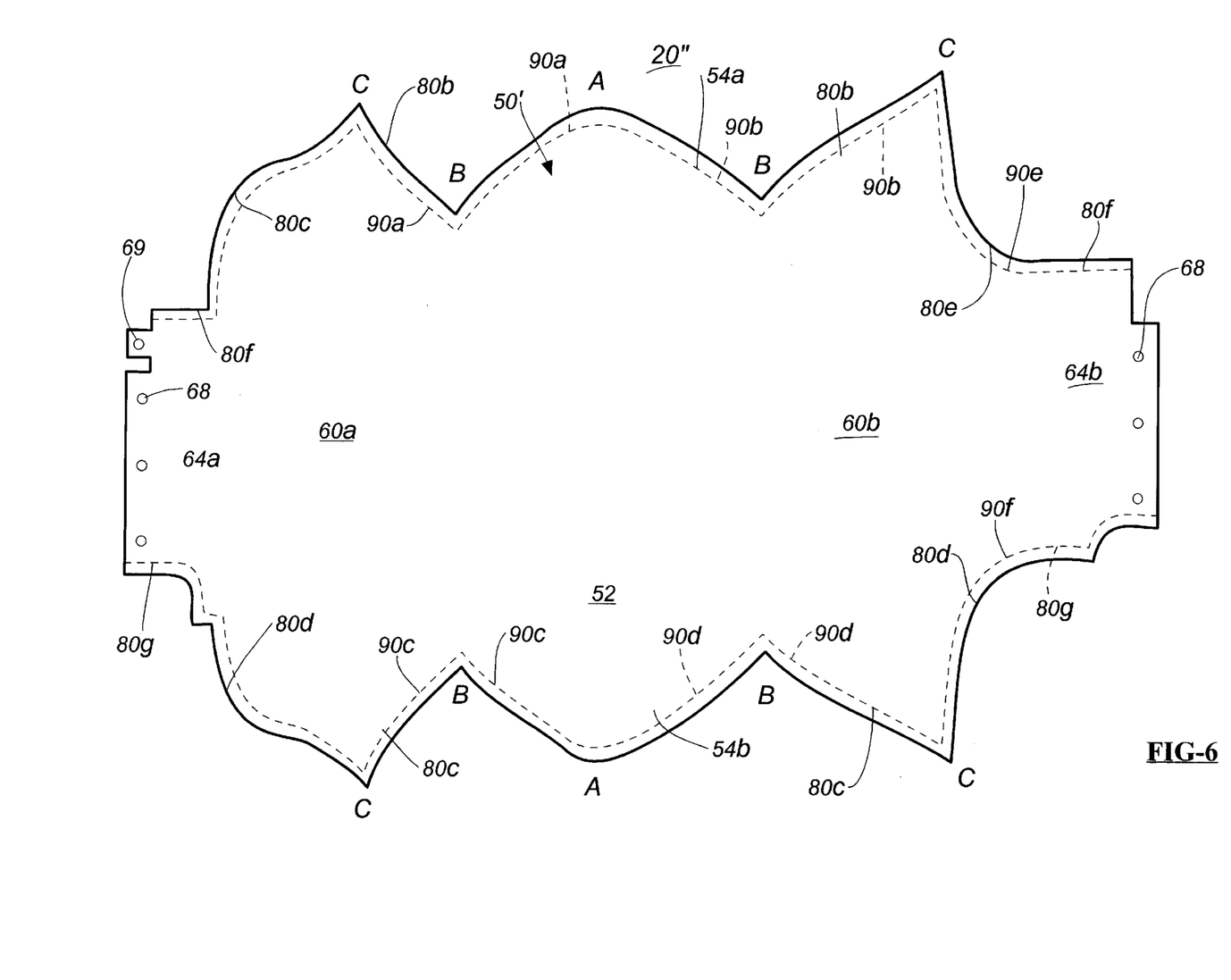
FIG. 6 is an alternate embodiment of the invention.
Figure 7:
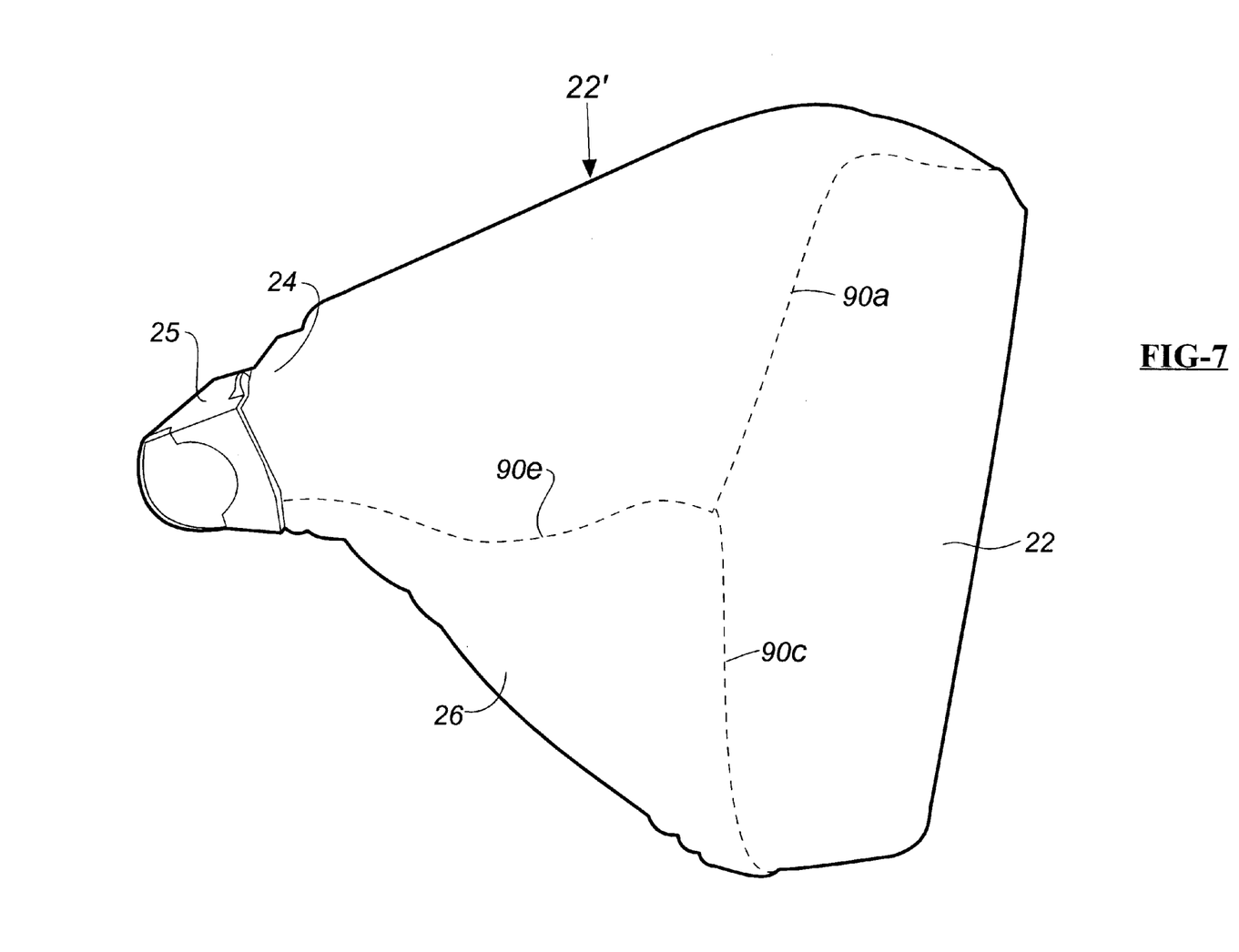
FIG. 7 illustrates an isometric view of an assembled, inflated air bag using the material pattern of FIG. 6.

Reference is briefly made to FIGS. 6 and 7 which illustrate an alternate embodiment of the present invention. FIG. 7 illustrates the general shape of an inflated air bag 20" using the material pattern of FIG. 6. The construction of the single piece fabric 50' of FIG. 6 is substantially similar to that shown in FIG. 2. The design of the material pattern for this bag will achieve a bag having a large internal volume while maintaining a relatively short neck 24. Sides 54*a* and 54*b* are convex outwardly shaped, sides 80*d* and 80*c* of section 60*a* are convex shaped while corresponding sides 80*c* and 80*d* of section 60*d* are convex shaped. Side 80*b* of panel 60*a* is concave, while side 80*b* of panel 60*b* is convex. The same is true for the sides 80*c* of the two panels.

Figure 8:
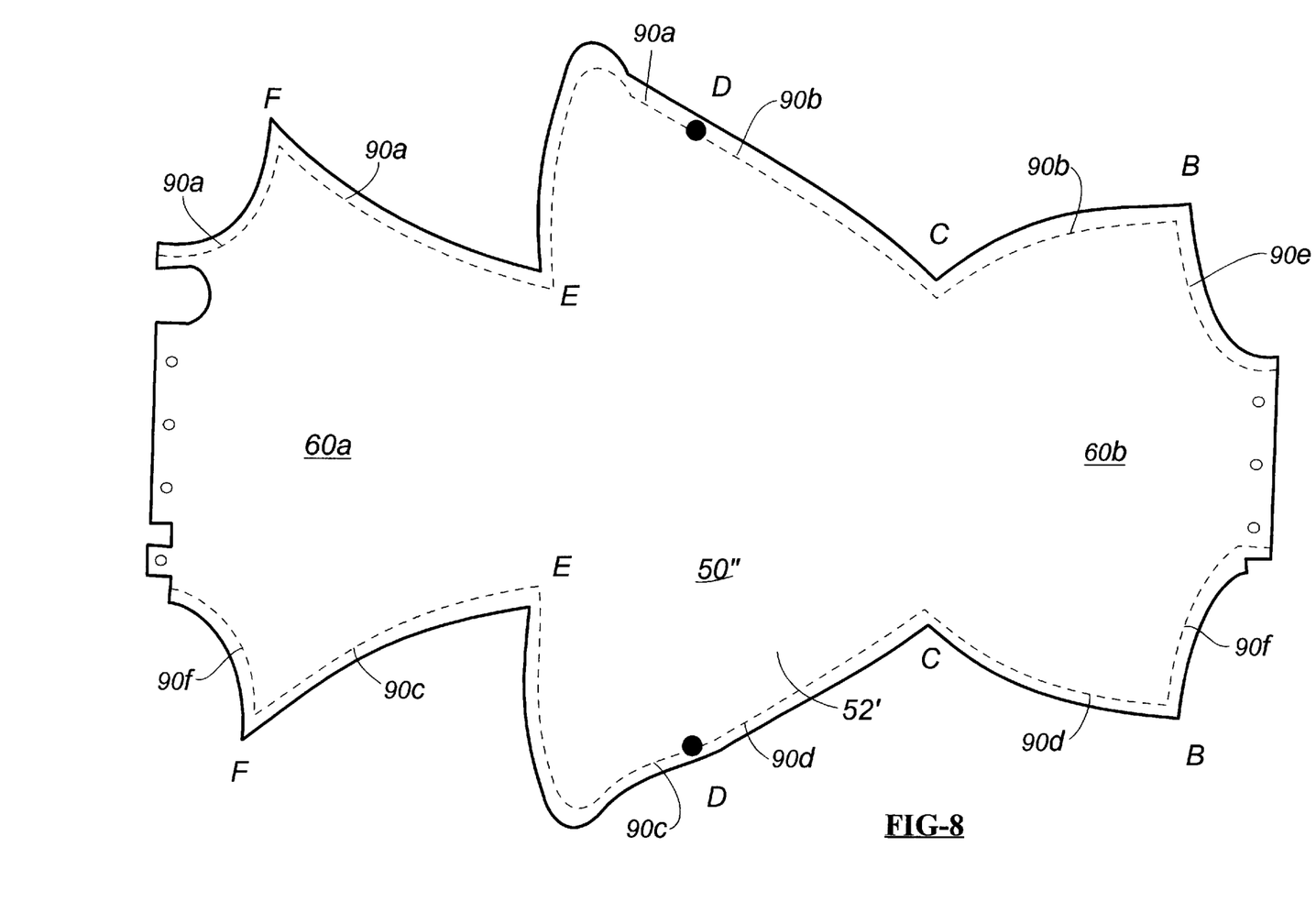
FIG. 8 illustrates an alternative embodiment of the invention.
Figure 9:
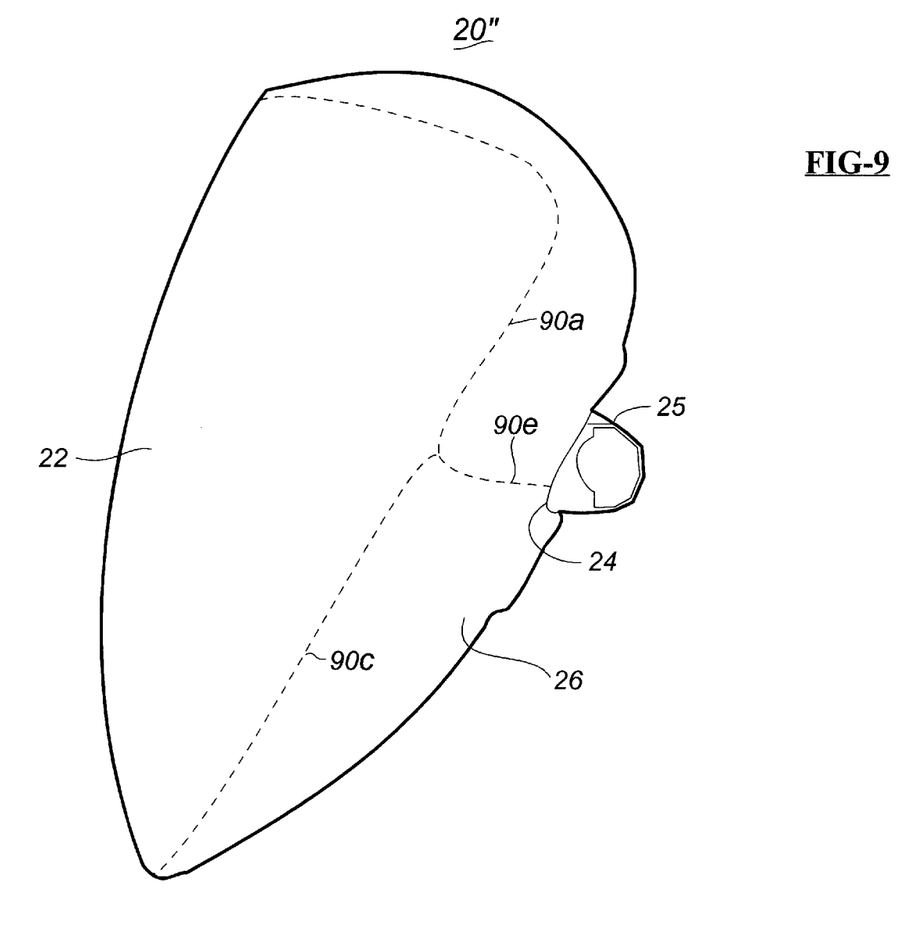
FIG. 9 illustrates an isometric view of an assembled, inflated air bag using the material pattern of FIG. 8.

In certain vehicle installations it is desirable to locate the inlet 24 closer to the top or the bottom of the assembled air bag so as to provide additional protection to either the occupant's upper or lower body. This construction can be achieved utilizing the air bag illustrated in FIG. 8. FIG. 9 shows an inflated air bag using the material construction of FIG. 8. This material pattern bag 50" utilizes two concave/convex or Princess seam lines in the top and bottom portions of the center cushion area 52'. The use of two Princess seams creates the desired bag shape and permits the designer to satisfy the system dynamics for a particular application. The concave portion located between points F and E is sewn to the convex shaped portion between points D and E of the asymmetrically shaped center panel 52'. Also, the edges of the bag along points D and C are sewn to edges between C and B. The neck portion is closed by sewing edges 80*f* and 80*g* together.

Many changes and modifications in the above described embodiment of the invention can, of course, be carried out without departing from the scope thereof. Accordingly, that scope is intended to be limited only by the scope of the appended claims.

We claim:

1. An inflatable air bag (20') comprising:
   an inlet portion (24) adapted to be attached to a source of inflation gas (70) and a cushion portion, initially maintained in a compact configuration prior to being inflated, the cushion portion being rapidly inflated by the inflation gas, the cushion including a plurality of seams (90) joining edges of the cushion material together to thereby form the cushion,
   and including a quadrilateral first section (52) having an opposing top and bottom and opposing sides and corresponding adjacent corners, wherein at least opposing sides, top and bottom and corners are arcuately shaped and wherein the bag further includes side panels (60*a, b*) which extend oppositely from the sides of the first section;
   wherein at least one edge of the cushion material is concave in shape and joined to another edge that is concave in shape.

2. The air bag as defined in claim 1 wherein the air bag is formed of a single piece of fabric (50, 50').

3. The air bag as defined in claim 1 wherein the resulting seam lines created upon sewing mating edges of the material together are arcuately shaped and positioned as far as possible away from areas of maximum stress that are created within the air bag.

4. The air bag as defined in claim 1 wherein seams extending through the inlet portion are arcuately shaped.

5. An inflatable air bag (20') comprising:
   an inlet portion (24) adapted to be attached to a source of inflation gas (70) and a cushion portion, initially maintained in a compact configuration prior to being inflated, the cushion portion being rapidly inflated by the inflation gas wherein locations of maximum stress are created within the material of the cushion during inflation, the cushion including a plurality of seams (90) joining edges of the cushion material together to thereby form the cushion, wherein the seams are arranged about the cushion at locations remote from the locations of maximum stress;
   including: a quadrilateral first section (52) having an opposing top and bottom and opposing sides and corresponding adjacent corners, wherein at least opposing sides, top and bottom and, corners are arcuately shaped and wherein the bag further includes side panels (60*a, b*) which extend oppositely from the sides of the first section;
   wherein each side panel comprises a quadrilateral portion (62*a,b*) and a connecting section (64*a,* 64*b*) which upon assembly forms an inlet neck portion and permits the air bag to be operatively connected to the source of inflation gas.

6. The air bag as defined in claim 5 wherein two of the sides of the quadrilateral portion are concavely shaped.

7. An inflatable air bag (20') comprising:
   an inlet portion (24) adapted to be attached to a source of inflation gas (70) and a cushion portion, initially maintained in a compact configuration prior to being inflated, the cushion portion being rapidly inflated by the inflation gas wherein locations of maximum stress are created within the material of the cushion during inflation, the cushion including a plurality of seams (90) joining edges of the cushion material together to thereby form the cushion, wherein the seams are arranged about the cushion at locations remote from the locations of maximum stress;
   wherein the air bag includes an oblong quadrilateral (52) first section having a first set of opposing sides (56*a,b*) that are concavely shaped and a second set of opposing sides (54*a,b*) that are convexly shaped, and wherein adjacent corners (56) are generally arcuately shaped, the air bag further including two extending side panels, each side panel respectively extends from each side of one of the sets of opposing sides, each side panel includes first and second concave edges which integrally extend from a respective concavely shaped side generally near the middle of the concavely shaped side, the side panels further including third and fourth edges which respectively extend away from one of the first and second concave edges.

8. An inflatable air bag (20') comprising:

an inlet portion (24) adapted to be attached to a source of inflation gas (70) and a cushion portion, initially maintained in a compact configuration prior to being inflated, the cushion including a plurality of seams (90) joining edges of the cushion material together to thereby form the cushion;

wherein the air bag includes an oblong quadrilateral (52) first section having a first set of opposing sides (56a,b) that are concavely shaped and a second set of opposing sides (54a,b) that are convexly shaped, the air bag further including two extending side panels, each side panel respectively extends from each side of one of the sets of opposing sides, each side panel includes first and second concave edges which extend from a respective concavely shaped side generally near the middle of the concavely shaped side, the side panels further including third and fourth edges which respectively extend away from one of the first and second concave edges.

9. The air bag as defined in claim 8 wherein the third and fourth edge of each extending side panel connects with a respective connecting section (64a, 64b) which upon assembly forms the inlet portion and permits the air bag to be operatively connected to the source of inflation gas.

10. The air bag as defined in claim 8 wherein the third and fourth edge of each side panel is concave, inwardly shaped.

11. The air bag as defined in claim 8 wherein the third and fourth edge of a first of the side panels is concave, inwardly shaped and wherein the third edge of the other side panel is convex, shaped and the fourth edge is convex shaped.

12. The air bag as defined in claim 11 wherein the third and fourth edge of each extending side panel connects with a respective connecting section (64a, 64b) which upon assembly forms the inlet portion and permits the air bag to be operatively connected to the source of inflation gas.

13. The air bag as defined in claim 1 wherein the resulting seam lines created upon sewing mating edges of the material together are arcuately shaped and positioned as far as possible away from areas of maximum stress that are created within the air bag.

14. The air bag as defined in claim 8 wherein seams extending through the inlet portion are arcuately shaped.

15. The air bag as defined in claim 1 wherein the air bag is formed of a single piece of fabric (50, 50').

16. An inflatable air bag (20') comprising:

an inlet portion (24) adapted to be attached to a source of inflation gas (70), the air bag when inflated having a top and a bottom and wherein the inlet portion is located closer to one of the top and bottom portions, the air bag further including a cushion portion, initially maintained in a compact configuration prior to being inflated, the cushion including a plurality of seams (90) joining edges of the cushion material together to thereby form the cushion;

wherein the air bag includes an asymmetrically shaped quadrilateral (52) center section having a first set of opposing sides (54a,b) that are symmetrically situated about a longitudinal axis and a second set of opposing sides (56a,b), a first side of the second set of opposing sides being dissimilar to a second side of the second set of opposing sides, the air bag further including two extending side panels, a first side panel extends from the first side and a second side panel extends from the second side, the first side panel includes first and second concave edges which integrally extend from the first side, the second side panel includes third and fourth concave edges which extend from the second side, the first side panel further includes fifth and sixth concave edges each respectively extending from an end of one of the first and second concave edges and the second side panel further includes seventh and eighth concave edges respectively extending from an end of one of the third and fourth edges.

17. The air bag as defined in claim 16 wherein the first and second side panel is linked to a respective connecting section (64a, 64b) which upon assembly forms the inlet portion and permits the air bag to be operatively connected to the source of inflation gas.

* * * * *